April 14, 1970 H. LAMPERT 3,506,287

LINEARLY ADJUSTABLE DEVICES

Filed Oct. 16, 1967 3 Sheets-Sheet 1

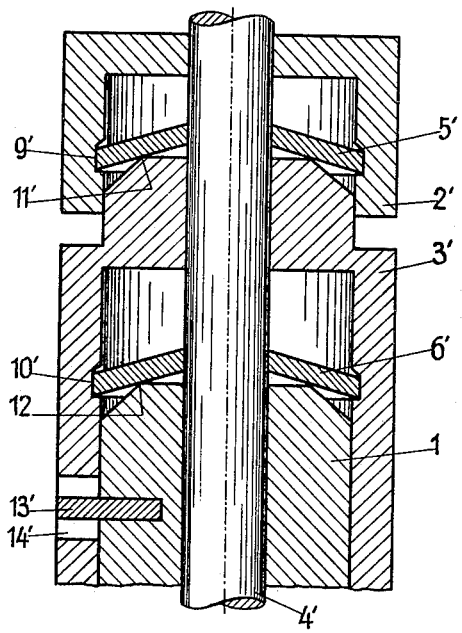
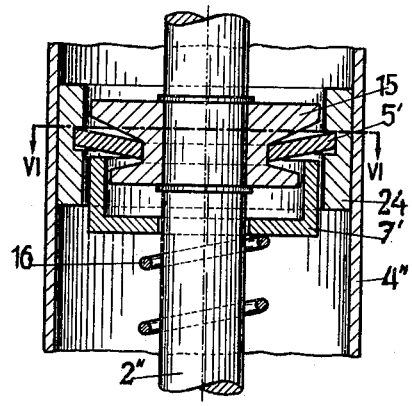
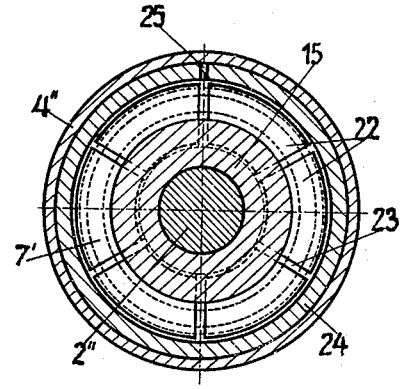

United States Patent Office 3,506,287
Patented Apr. 14, 1970

3,506,287
LINEARLY ADJUSTABLE DEVICES
Heinz Lampert, Schuthausstrasse 21,
Buchs, Switzerland
Filed Oct. 16, 1967, Ser. No. 675,631
Claims priority, application Austria, Oct. 20, 1966,
A 9,768/66
Int. Cl. E04g 25/04; G05g 5/26
U.S. Cl. 287—58                                    17 Claims

ABSTRACT OF THE DISCLOSURE

A linearly adjustable device is fixable by a locking mechanism through friction and comprises a supporting tube slidable in or on a vertical pipe in telescope fashion, there being axially adjustable, concentrically mounted coupling tubes slidable in or on the vertical pipe and being connected to movable locking elements which engage the supporting tube.

---

Figure 1:
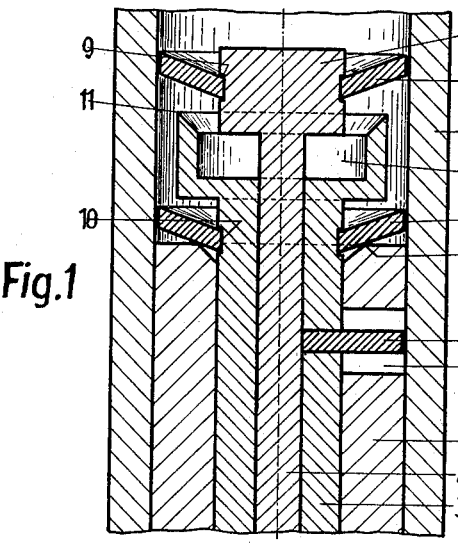

The invention relates to linearly adjustable devices fixable by a locking mechanism through friction and having a supporting tube sliding in or on a vertical pipe in the manner of a telescope.

Adjusting devices for mounting racks, pieces of furniture or the like, wherein two tubes connected with the parts adjustable relatively to one another, are mounted into one another, as in a telescope, and are manually, hydraulically or electrically adjustable relative to one another, have already been proposed in various embodiments. In known telescopic tubes of this kind, an eccentric disk rotatable about a horizontal axis is mounted on the outside of the external tube in order to stop the internal tube in a selected vertical position. The external tube is provided with a slot into which the eccentric disk may engage and join to the internal tube in such manner that the latter is pressed and held against the external tube upon turning of the eccentric disk.

In this embodiment, the slot in the external telescopic tube is a disadvantage because it is not completely closed by the eccentric disk; thus dirt may penetrate inside with the result of an additional friction between the guiding surfaces of the tubes, which complicates the adjustment of the tubes. Another disadvantage is the slotted outer surface of the telescopic tubes, which constitutes an unfavorable structural weakening. Furthermore, only a relatively small clamping force can be produced by means of an eccentric disk of this kind, since the contact surface between the eccentric disk and the internal tube is relatively small and much force has to be spent in order to realize a sufficient surface pressure between the internal and the external tube.

Hydraulic lifting devices having an orientable manually operated lever, by means of which a chair or the like may be hoisted, and may be fixed in its upper end position, are economically disadvantageous and easily damaged, which additionally increases the costs.

Therefore a lifting device is required which is easy to operate and simple in construction so that it can be applied in many ways without any risk of frequent repairs. A device of this kind must also be reliably fixed in any desired vertical position. Though it is operated from outside, dirt has to be prevented from penetrating inside the telescopic tubes.

This result is obtained by axially adjustable, concentrically mounted coupling tubes sliding in or on the vertical pipe, which are connected with movable locking elements adjacent the supporting tube.

In a preferable embodiment, the head of the coupling tube axially adjustable in the vertical pipe is provided with an aperture like a cup in such manner that the piston of the tube sliding in the external coupling tube—which may preferably be formed as a rod—may be inserted into said aperture.

According to the invention, the locking elements are preferably cup springs which are inserted in annular grooves in the piston or in the external coupling tube and the outer edges of which join to or abut the inside surface of the supporting tube sliding on the outer surface of the vertical pipe. In order to increase elasticity, the cup springs may be provided with a slot in a known manner.

Since the bending resistance of these cup springs—in particular with a great weight of the load to be lifted—is often strained to a too high degree, it has been proposed to divide the cups into segments. The effect is the same, though it is sometimes necessary to give the cups a radial initial stress by means of an auxiliary spring. By division into segments no further elastic deformation is necessary in such manner that the thickness of such segments may be chosen at discretion. In the locking position, a profile similar to a rolling body is obtained, which considerably increases the clamping force. In this embodiment, the lifting tube or the lifting rod is strained much less as regards its rigidity and therefore they are worn much less.

Due to the high local strain of the lifting tube, an improved and hardened material is required. Because of the high costs this is uneconomical and often requires a reworking so that there is almost no advantage in comparison to a hydraulically operated device.

According to another feature of the invention, rings for pressure distribution which are slotted or divided into cylinder segments, transfer the clamping force to the lifting tube, preferably free of losses. As they are only short or slotted or divided into cylinder segments, the tensions are distributed on the lifting tube in such manner that the local tensions do not exceed the permissable values.

According to this preferable embodiment of the invention, a holder supporting a locking element adjacent the supporting tube is provided on the upper end of the lifting rod adjustable in the vertical pipe which is firmly connected to the latter, below said holder, a cup is provided the projecting edge of which lies under the locking element and which is in distance from a holder equally supporting a looking element adjacent the supporting tube and is adjustable on the lifting rod; said holder is supported by balls which rest on an inclined surface of the vertical pipe sloping inwards, until the lifting rod has been withdrawn in such manner that the balls fall into the space formed by a groove in the lifting rod and a recess in the vertical pipe, whereafter a corresponding inclined surface of the holder rests on the inclined surface of the vertical pipe.

The locking elements in the upper and lower holder preferably consist of segments of cup springs, radially extending slots being disposed between the single segments. A ring for pressure distribution may be inserted between the locking elements of the upper and lower holder and the vertical pipe, which—apart from the small wear of the material—has the additional advantage that pressure is regularly distributed on a relatively great surface. Said ring for pressure distribution may consist of an extensible material or of metal, whereby it is provided with a slot and divided into segments in the latter case.

According to a preferable embodiment, the cup spring of the lower holder abuts against the release edge on the upper end of the vertical pipe only upon its return and is lifted by the supporting tube. Thus the available brake action of the lower spring, which is smaller than that of the upper spring, is adapted to the latter, which improves the available lift.

The linearly adjustable device according to the invention may be employed in many fields. It may be incorporated in adjusting devices of hairdressers' and dentists' chairs as well as in the support of table lifting devices, drafting machines, small cranes etc; it may also be useful in tensioning elements in tool construction, in adjustable elements of agricultural machinery or the like. The fields of application are thus very broad.

The invention is hereinafter described in greater detail with reference to the accompanying drawing without being limited to the embodiments illustrated therein.

In the drawing:

FIGURES 1 to 4 are sectional views of a first embodiment in four different control positions, FIGURE 5 represents an equivalent second embodiment in vertical section in starting position, FIGURES 6 to 9 show another embodiment of the device according to the invention in vertical section in four different control positions, FIGURE 10 shows in vertical section an embodiment comprising a ring for pressure distribution, and FIGURE 11 is a section taken along the line VI—VI in FIG. 10.

In the rest postition according to FIG. 1, there is shown a cup spring 5 having an inner edge seated in an annular groove 9 of a piston 8 firmly connected with a coupling rod 2, the inner edge of cup spring 6 being supported in a similar annular groove 10 in an external coupling tube 3, the outer edges of springs 5 and 6 being pressed against the inner surface of the supporting tube 4 on the upper end of which the device to be lifted—not shown in the drawing—is provided. As the coupling rod 2 in the external coupling tube 3 is adjustable in both directions, the supporting tube 4 is not influenced. Owing to its weight, the latter tends to move towards the vertical pipe 1, the cup spring 6 adjacent the inner surface of the supporting tube 4 being taken along until it rests on the vertical pipe 1.

The upper edge of the vertical pipe 1 is chamfered, thus forming a knife edge 12. As the cup spring 6 is oblique to the guide motion of the supporting tube 4, it abuts against the edge 12 about which it tends to rotate in the manner of a two-armed lever. Being limited by the coupling tube 3 and the inner surface of the supporting tube 4, the cup spring 6 spreads between said two parts, thus holding the supporting tube 4 in its position.

Figure 2:
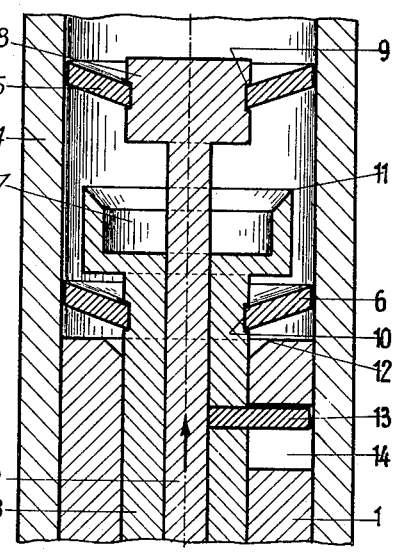

If the coupling rod 2 is displaced against the pressure direction of the supporting tube 4 according to FIGURE 2, the cup spring 5—similar to the cup spring 6—clamps against the inner surface of the supporting tube 4, taking the latter along because of the friction. Thus the spring 6 is released from its spreading position, the clamping effect thereof is eliminated and the coupling tube 3 is taken along in the direction of adjustment of the supporting tube 4 until a pin 13—radially offset from the external coupling tube 3—abuts against the upper surface of an aperture 14 in the vertical pipe 1.

Figure 3:
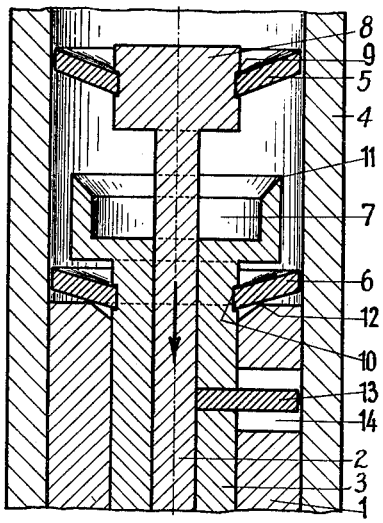
Figure 4:
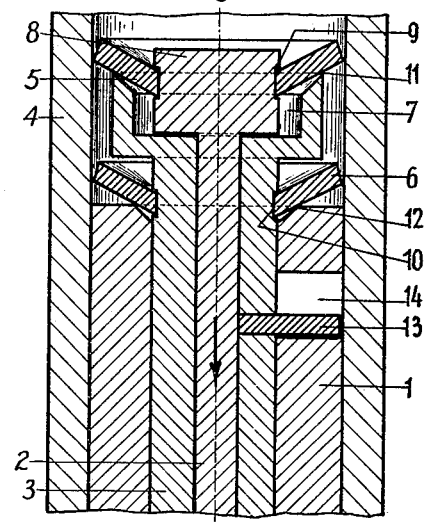

If, as in FIG. 3, the coupling rod 2 is moved in the direction towards the vertical pipe 1, the spring 5 is unlocked and the spring 6 is loaded in analogy with the resting position according to FIGURE 1 in such manner that the supporting tube 4 cannot move in the direction of the vertical pipe 1. Not until the coupling rod 2 is lowered in such manner that its cup spring 5 abuts against the knife edge 11 in the chamfered upper edge of the aperture 7 (like the cup spring 6 in the head of the coupling tube 3) is the latter pressed down. Thus the cup spring 5 is counterclockwise rotated about the knife edge 11, as a point of rotation, and is completely lifted from the inner surface of the supporting tube 4. Thus, the force of the downward movement is transferred from the coupling rod 2 to the coupling tube 3, the cup spring 6 counterclockwise rotating about the edge 12 upon further downward movement of the tube 3, thus lifting the latter from the supporting tube 4. Now the tube 4 is completely unlocked and may move down owing to its weight.

In a second embodiment shown in FIGURE 5 in initial position, the supporting tube 4' is displaced inside the vertical pipe 1, the coupling tube 3' gliding on the outer surface of the vertical pipe 1. The coupling element 2' supporting the cup spring 5' is also formed as a tube and the cup springs 5', 6' are inserted in corresponding annular grooves 9', 10' of the inner surfaces of the tubes 2', 3'. All other reference numerals correspond to those in the first embodiment (FIGURES 1 to 4) and have been primed. Therefore the function is not again explained in detail.

The coupling rod 2 or the coupling tube 2' may be mechanically, hydraulically or electrically lifted or lowered in a known manner.

Figure 6:
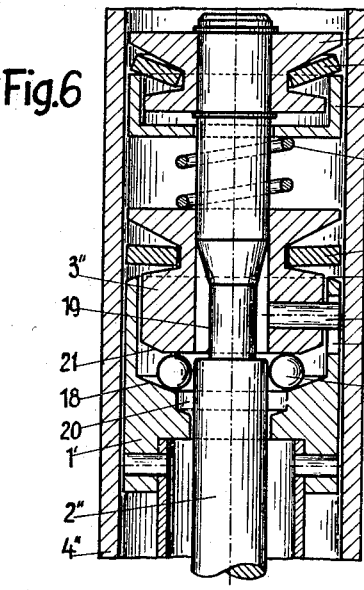

In the third embodiment, the linearly adjustable device according to the invention is represented according to FIGURE 6 in resting position. The weight of the lifting rod 2" and of the spring holders 15 firmly connected with the latter press on the cup spring 5' in the holder 15 on the cup 7' in which slides the lower part of the spring holder 15. The cup 7' transfers the pressure over a helical spring 16 disposed around the shaft of the lifting rod 2" to the lower spring holder 3" which rests on balls 17 resting against the inclined surface 18 in the vertical pipe 1'. Despite the inclination of surface 18 which conically slope inwards, the balls 17 have to transfer said force as they are prevented by the lifting rod 2" from rolling off inwardly.

Owing to the pressure in the direction of the cup 7', the projecting border of the latter joins or abuts the cup spring 5', lifting the latter from the inner edge of the supporting tube 4", whereby it is unlocked. However, the spring 6' of the lower spring holder 3" is so high that it does not abut against the release edge 26 of the vertical pipe 1'. Thus the spring 6' spreads on the inner surface of the supporting tube 4" and clamps against the latter.

Figure 7:
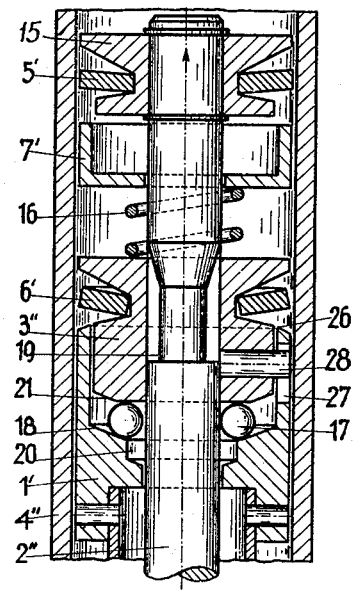

In the lifting movement according to FIGURE 7, the lifting rod 2" and the spring holder 15 comprising the spring 5' is moved upwards. The supporting spring 16 is released and does not exert any pressure on the cup 7'. Thus its projecting border no longer joins or abuts to the spring 5', giving the latter a twisting moment away from the supporting tube 4"; said spring 5' joins to the inner surface of the supporting tube 4", spreading on the spring holder 15 by the upward movement of the latter. Thus the supporting tube 4" is taken upwards, lifting the adjacent and locking spring element 6' outside so that its clamping force is eliminated.

Figure 8:
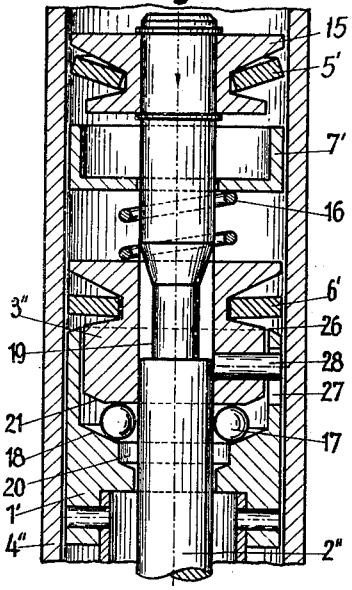
Figure 9:
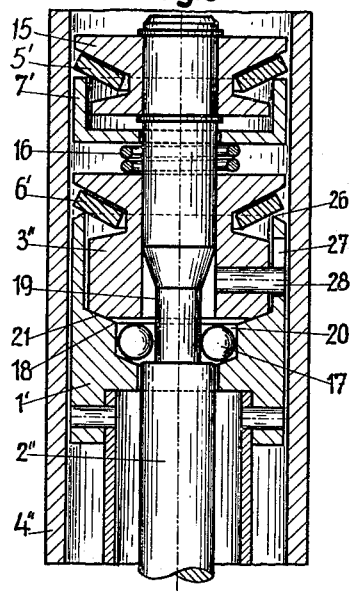

In the lifting according to FIGURE 8, the lifting rod 2" is moved downwards. The spring 5' is lifted on the outer edge by the friction of the tube and is unlocked from the supporting tube 4". The outer edge of the spring 6', however, is taken down, spreads on the inner surface of the supporting tube 4", preventing any further return by the clamping effect.

If this locking position is to be eliminated, the lifting rod (FIGURE 9) is withdrawn under compression of the spring 16 below the resting position shown in FIGURE 6. The spring 5' remains unlocked. The balls 17 may fall into a space formed by the aperture 20 in the vertical pipe 1' and the groove 19 of the lifting rod 2", the lower holder 3" thus losing its support and coming to rest on the corresponding inclined surface 18 of the vertical pipe 1'. The spring 6' is moved downwards until it is given a counterclockwise twisting moment by resting on the edge 26 of the vertical pipe 1' and is lifted from the inner surface of the supporting tube 4". Thus unlocked, the supporting tube 4" may be completely lowered.

The lifting tube 2″ is lifted to the resting position according to FIGURE 6 for further stoppage, whereby the balls 17 are removed in the supporting position for the holder 3″. Thus the spring 6′ is also moved in the locking position shown in FIGURE 6.

FIGURES 10 and 11 show another embodiment of the linearly adjustable device according to the invention. The spring 5′ does not directly join or abut the supporting tube 4″, but it is operatively connected with the latter by means of a ring 24 for pressure distribution. In this embodiment, the supporting tube 4″ may be much weaker and need not consist of an expensive, particularly hardened material, since the degree of wear is much lower than in the case where the spring 5′ directly spreads on the supporting tube 4″. Said ring for pressure distribution may, of course, also be provided in the lower spring 6′.

The ring 24 for pressure distribution may consist of an elastic material. In the latter case it must be provided with a slot 25 or be divided into segments in such manner that by enlarging its diameter, it may be pressed towards the inner surface of the supporting tube 4″.

In the top view according to FIGURE 11, an embodiment of locking elements is shown wherein the latter consist of spring segments 22 which are divided from one another by slots 23.

In order to limit the adjustment of the lower spring holder 6, the latter is provided with a bolt 28, the projecting end of which slides in the aperture 27 in the vertical pipe 1′.

What I claim is:

1. A linearly adjustable device adaptable for telescopic lifting apparatus, said device comprising a base element and a supporting element concentrically arranged for relative movement, coupling elements movable concentrically relative to the base and supporting elements, and locking means between said coupling elements and the supporting elements for establishing relative locking positions of the base element and supporting element, wherein said base element is a tube in which a first coupling element also a tub is movable and in the latter a second coupling element consisting of a rod is movably mounted, said supporting element being in operative connection with said tubular coupling element and said coupling rod via said locking means, said supporting element being formed as a tube slidably and movably mounted on the outer surface of said tubular base element.

2. A linearly adjustable device according to claim 1 wherein said tubular coupling element is axially movable in said base tube and is provided with a cup-like enlargement on its head into which is inserted a piston of said coupling rod.

3. A linearly adjustable device according to claim 1 wherein the upper edge of said tubular base element is chamfered, thus forming a knife edge.

4. A linearly adjustable device according to claim 1 comprising a pin radially offset from the external coupling element projects into a groove in said base element, thus limiting the axial adjustment of said external coupling element.

5. A linearly adjustable device according to claim 2 wherein the upper edge of the enlargement has a chamber forming a knife edge.

6. A linearly adjustable device adaptable for telescopic lifting apparatus, said device comprising a base element and a supporting element concentrically arranged for relative movement, coupling elements movable concentrically relative to the base and supporting elements, and locking means between said coupling elements and the supporting elements for establishing relative locking positions of the base element and supporting element, wherein one coupling element constituted as a tube is movable on the outer surface of said base element also constituted as a tube, a second coupling element being also formed as a tube gliding on the upper end of said one coupling element, said supporting element being in operative connection with the inner surface of said two coupling tubes via said locking means and being arranged in said base tube and constituted as a rod.

7. A linearly adjustable device according to claim 6 wherein said coupling tubes are provided with annular grooves on their internal wall, said locking means comprising locking elements formed as cup springs supported in said grooves and concentrically engaging said supporting rod and movable thereon.

8. A linearly adjustable device according to claim 7 comprising a pin in said base element which projects into a groove in said first coupling tube, thus limiting axial adjustment of the latter.

9. A linearly adjustable device adaptable for telescopic lifting apparatus, said device comprising a base element and a supporting element concentrically arranged for relative movement, coupling elements movable concentrically relative to the base and supporting elements, and locking means between said coupling elements and the supporting elements for establishing relative locking positions of the base element and supporting element, wherein said locking means comprises cup springs which are inserted into annular grooves of said coupling elements and have outer edges engageable with the inner surface of said supporting element which is slidable on the outer surface of said base element.

10. A linearly adjustable device according to claim 9 wherein said cup springs are provided with a radially extending slot.

11. A linearly adjustable device adaptable for telescopic lifting apparatus, said device comprising a base element and a supporting element concentrically arranged for relative movement, coupling elements movable concentrically relative to the base and supporting elements, and locking means between said coupling elements and the supporting elements for establishing relative locking positions of the base element and supporting element, wherein said locking means comprises a plurality of locking elements, said coupling elements comprising a lifting rod adjustable in said base element and firmly connected with the latter, a holder on said rod supporting a locking element adjacent said base element under the latter, a cup having a projecting rim which lies under said locking element and is spaced from a holder also supporting a locking element adjacent said supporting element by means of a helical spring centrally embracing said lifting rod and adjustable thereon, balls supporting the latter holder and resting on an inclined surface sloping inwardly of said base element until the lifting rod is withdrawn in such manner that said balls fall into a space formed by a groove in the lifting rod and an enlargement in said base tube, a corresponding inclined surface of said holder resting on the inclined surface of said base element.

12. A linearly adjustable device according to claim 11 wherein said locking elements are constituted as cup springs.

13. A linearly adjustable device according to claim 12 wherein said locking elements in said holders consist of segments of cup springs, radially extending small slots being provided between respective segments.

14. A linearly adjustable device according to claim 11 comprising a ring for pressure distribution between said locking element of one of said holders.

15. A linearly adjustable device according to claim 14 wherein said ring for pressure distribution is segmented.

16. A linearly adjustable device according to claim 15 wherein the cup spring of the lower spring holder engages the release edge on the upper end of said base element only upon return and is lifted from said supporting tube.

17. A linearly adjustable device according to claim 11 comprising a pin on said lower holder projecting into a grove of said base element for limiting axial adjustment of the lower holder.

(References on following page)

References Cited

UNITED STATES PATENTS

| | | |
|---|---|---|
| 2,329,932 | 9/1943 | Nelson. |
| 2,613,746 | 10/1952 | Whitney _____ 294—93 X |
| 2,707,108 | 4/1955 | Schottler _____ 188—67 X |
| 3,107,933 | 10/1963 | Royster. |
| 3,306,127 | 2/1967 | Rieger. |
| 3,316,774 | 5/1967 | Vogelgesang. |
| 3,363,724 | 1/1968 | Quatkemeyer. |

DAVID J. WILLIAMOWSKY, Primary Examiner

W. L. SHEDD, Assistant Examiner

U.S. Cl. X.R.

74—531; 92—23; 188—67